Nov. 20, 1934.  M. G. TORSON  1,981,010
ICE CREAM FREEZING TRAY
Filed Dec. 8, 1931   2 Sheets-Sheet 1
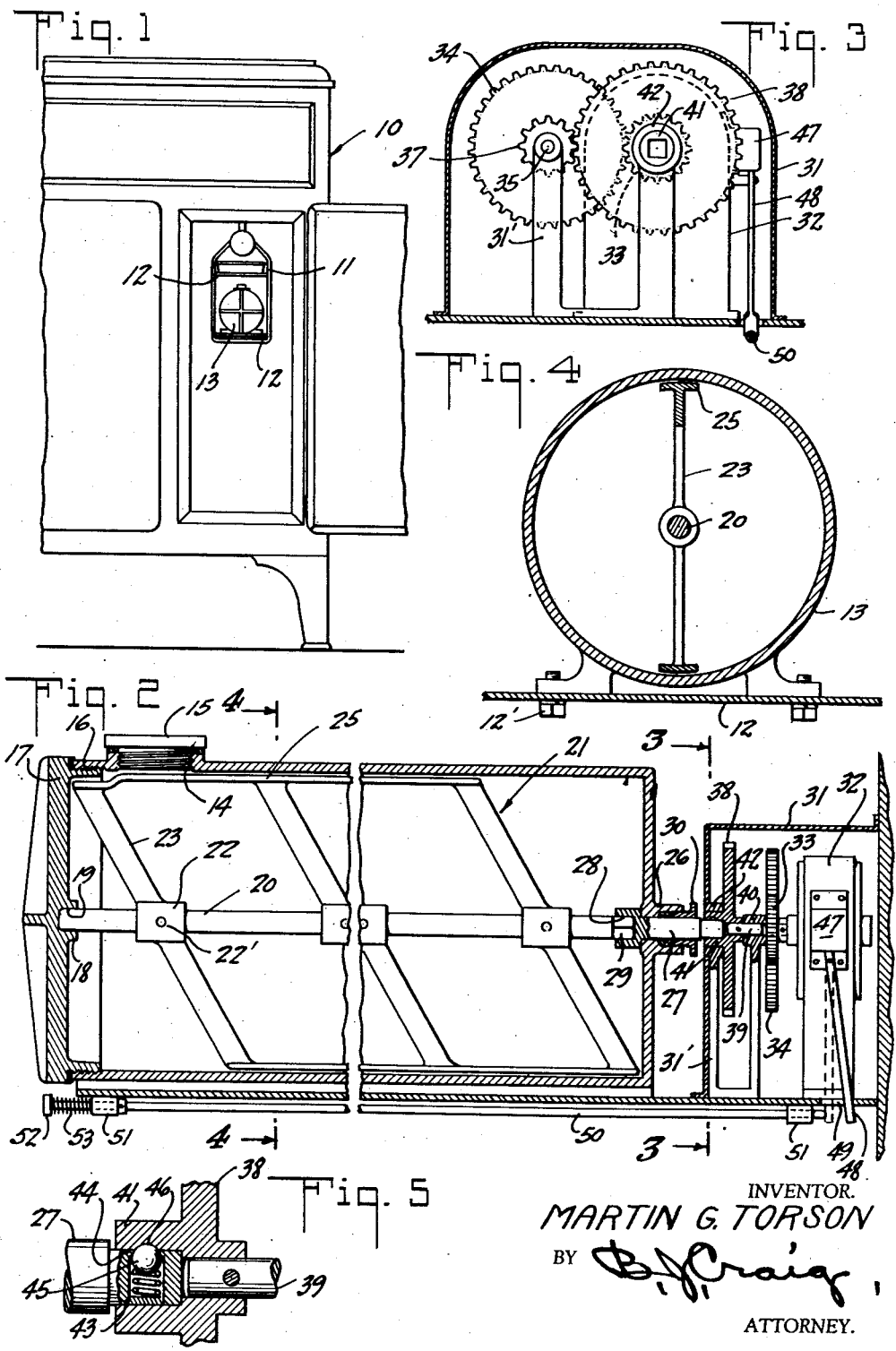
INVENTOR.
MARTIN G. TORSON
BY B. J. Craig
ATTORNEY.

Nov. 20, 1934.   M. G. TORSON   1,981,010
ICE CREAM FREEZING TRAY
Filed Dec. 8, 1931   2 Sheets-Sheet 2
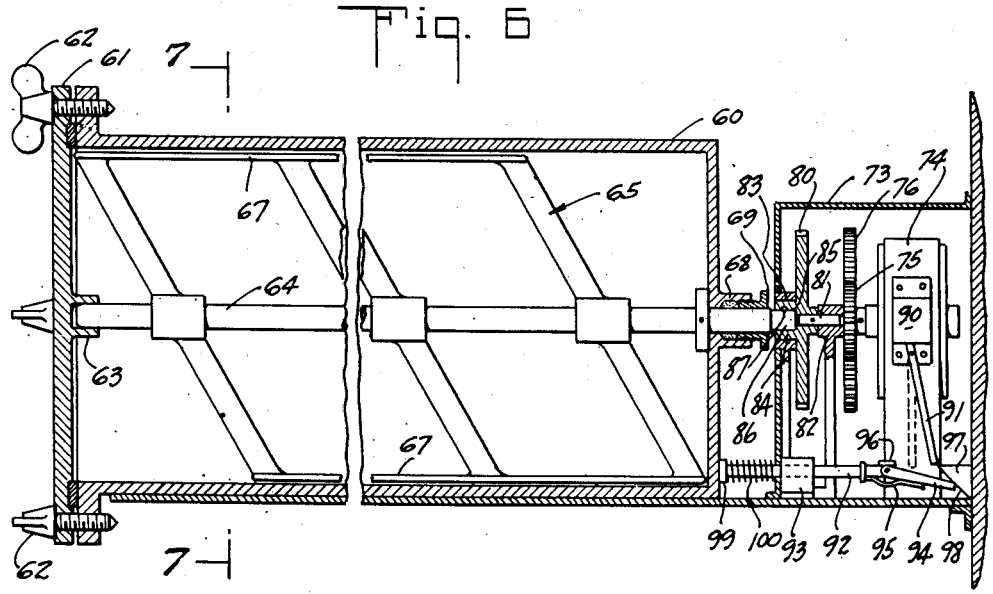
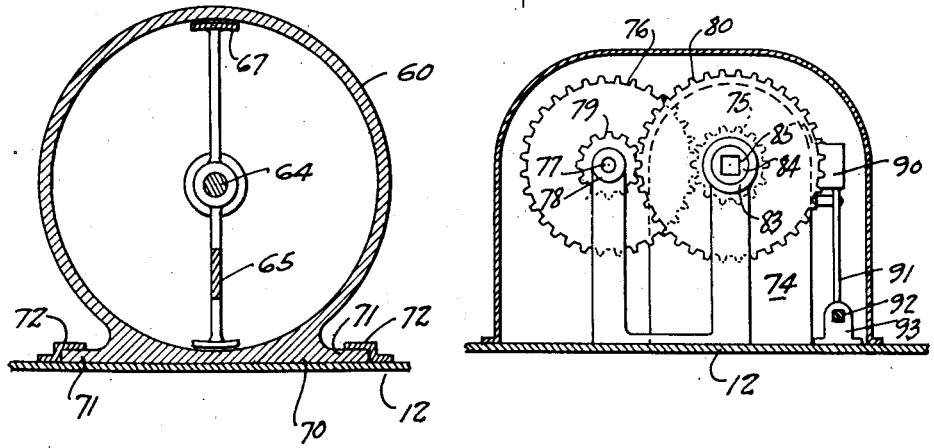
INVENTOR.
MARTIN G. TORSON
BY
ATTORNEY.

UNITED STATES PATENT OFFICE 1,981,010

ICE CREAM FREEZING TRAY

Martin G. Torson, Kansas City, Mo.

Application December 8, 1931, Serial No. 579,735

1 Claim. (Cl. 259—109)

This invention relates to ice cream freezing devices for use in iceless refrigerators.

The general object of the invention is to provide an ice cream freezing device for use in iceless refrigerators which includes mechanically operated stirring means.

Another object of the invention is to provide a device of the class described including a container built in the freezing compartment of the refrigerator and the container including stirring means which is operated by an electric motor also built in the refrigerator.

A further object of the invention is to provide a device of the class described including a container removably mounted in the freezing compartment of the refrigerator and the container including stirring means which is operated by an electric motor built in the refrigerator.

An additional object of the invention is to provide a device of the class described wherein means is provided for stopping the stirring device when the substance being frozen reaches a certain viscosity.

Other objects of this invention will be apparent from the following description taken in connection with the accompanying drawings wherein:

Fig. 1 is a front elevation of a refrigerator embodying the features of my invention.

Fig. 2 is a central sectional view through my improved ice cream freezer, showing a portion of the driving mechanism in elevation and a portion in section.

Fig. 3 is a section taken on line 3—3, Fig. 2.

Fig. 4 is a section taken on line 4—4 of Fig. 2.

Fig. 5 is a sectional detail.

Fig. 6 is a view similar to Fig. 2, showing a slight modification of my invention.

Fig. 7 is a section taken on line 7—7, Fig. 6, and

Fig. 8 is a section taken on line 8—8 of Fig. 6.

Referring to the drawings by reference characters, I have indicated my invention as designed for use with a refrigerator indicated generally at 10.

This refrigerator is preferably electrically operated and may be of any desired character, although preferably it will contain a freezing compartment and a refrigerating device which is preferably operated by an electric motor.

As is customary with refrigerators of this type, the freezing compartment 11 contains shelves 12 on which material to be frozen may be placed.

According to my invention, I secure on the lower shelf 12 by a plurality of bolts 12' a container 13 which is preferably cylindrical in shape and which is provided with an aperture 14 having a closure 15. The freezer is preferably charged through the opening 14 after which the closure 15 can be secured in place. One end of the container 13 is threaded as at 16 to receive a threaded closure 17. This threaded closure 17 has a central boss 18 thereon which is provided with a cavity 19 to serve as a bearing for one end of a shaft 20 of a stirring device 21. This shaft 20 has hubs 22 secured thereby by pins 22' and from the hubs inclined radial members 23 extend. The ends of the radial members 23 are connected by bars 25 as clearly shown in Fig. 2.

Opposite the closure 17 the container 13 is provided with an apertured boss 26 which receives a shaft 27. This shaft 27 is enlarged at one end where it is provided with a rectangular socket 28 to receive a rectangular head 29 on the shaft 20. The construction is such that when the closure 17 is removed, the shaft 20 and associated parts may be removed from the container to allow the ice cream therein to be removed.

The boss 26 includes a packing gland 30 to prevent leakage along the shaft 27 out of the container 13.

In the rear of the container 13 I provide a compartment 31 in which an electric motor 32 is positioned. The armature shaft of the motor 32 includes a gear 33 which meshes with a gear 34 secured to a shaft 35 mounted in bearings 36. Also secured to the shaft 34 I provide a gear 37 which meshes with a gear 38 secured to a shaft 39 which is mounted in a bearing 40.

The gear 38 includes an enlarged hub 41 which is mounted in a bearing 42 and includes a rectangular recess 43. As clearly shown in Fig. 5 the shaft 27 includes a reduced rectangular end portion 44 which is adapted to be positioned in the rectangular recess 43 of the gear 38. The end portion 44 of the shaft 27 includes a spring pressed ball snap connection device 45 the ball of which is adapted to engage an annular recess 46 provided in the hub 41 of the gear 38.

The motor 32 may be operatively connected to a source of electric energy in any desired manner.

From the foregoing it will be apparent that when the motor 32 is started it will rotate the shaft 20 in the container 13 through the medium of the shaft 27 and the gear train just described.

For controlling the motor 32 I provide an overload switch 47 which may be of any desired type including a reset lever 48. I preferably use the overload switch 47 also as a starting switch. The reset lever 48 of the overload switch extends downwardly through an aperture 49 in the shelf 12 and is adapted to be engaged by a push rod 50 mounted in bearings 51 on the underside of the shelf 12. At the forward end of the rod 50 I provide an enlarged head 52 and surrounding the rod between the head 52 and the adjacent bearing 51 I provide a coiled spring 53 which resiliently urges the rod 50 forwardly.

When it is desired to start the stirring device 21 the operator pushes the rod 50 rearwardly against the action of the spring 53 whereupon the rod 50 engages the reset lever 48 and moves it from the dotted line position shown in Fig. 2 to the full line position thereby resetting the overload switch 47 and starting the motor which rotates the stirring device 21 as previously described.

When the viscosity of the substance in the container 13 reaches a certain point and excessive strain is put on the motor 32 the overload switch 47 cuts out and stops the motor 32. When the overload switch 47 cuts out, the reset lever 48 is moved from the full line position shown in Fig. 2 to the dotted line position.

In Fig. 6 I show a slight modification of my invention wherein the container 60 is provided with a closure 21 which may be held in place by thumb nuts 62. This closure has a boss 63 thereon which receives and acts as a bearing for the end of the shaft 64. The shaft 64 of a stirring device 65 has radial members 66 thereon which are connected by bars 67 similar to the stirring device 21 previously described.

The other end of the shaft 64 passes through an apertured boss 68 which includes a packing gland 69 to prevent leakage along the shaft.

The container 60 is provided with a base 70 having flanges 71 thereon which fit beneath guides 72 on the shelf 12.

In the rear of the container 60 I provide a compartment 73 in which I provide an electric motor 74 having a gear 75 on the armature shaft thereof which meshes with a gear 76 secured to a shaft 77 mounted in bearings 78. Also secured to the shaft 77 I provide a gear 79 which meshes with a gear 80 secured to a shaft 81 which is mounted in a bearing 82. The gear 80 includes an enlarged hub 83 which is mounted in a bearing 84 and includes a rectangular recess 85. The shaft 64 includes a reduced rectangular end portion 86 which is adapted to be positioned in the recess 85 of the gear 80. The end portion 86 of the shaft 64 includes a spring pressed ball connection device 87, the ball of which is adapted to engage a coacting recess in the hub of the gear 80 similar to the ball of the connection 45 shown in Fig. 5.

The motor 74 may be operatively connected to a source of electric energy in any desired manner.

From the foregoing it will be apparent that when the motor 74 is started it will rotate the shaft 64 in the container 60 through the medium of the gear train just described.

For controlling the motor 74 I provide an overload switch 90 which may be of any desired type including a reset lever 91. I preferably use the overload switch 90 also as a starting switch.

For actuating the reset lever 91 I provide a push rod 92 which is preferably rectangular in cross section and which is slidably mounted in a bearing 93. Adjacent the rear of the push rod 92 I pivotally mount thereon a finger 94 which is resiliently retained in a raised position by a spring 95. To restrict upward movement of the finger 94 I provide a stop 96 on the rod 92.

Secured to the rear wall of the refrigerator just past the point of throw of the reset lever 91 I provide a member 97 having an inclined cam face 98. At the forward end of the rod 92 I provide an enlarged head 99 and surrounding the rod 92 between the head 99 and the bearing 93 I provide a coiled spring 100 which resiliently urges the rod 92 forwardly.

For restricting the forward movement of the rod 92 I provide on the rod a collar 101.

When it is desired to freeze a substance in the container 60 the container is removed from the refrigerator, the closure member 61 removed from the container and the desired ingredients placed in the container. The closure 61 is then replaced and the container 60 placed in the refrigerator. As the container is moved rearwardly the rectangular portion 86 of the shaft 64 enters the rectangular recess of the gear 80 and at the same time the end of the container engages the head of the rod 92 and moves the rod rearwardly. As the rod 92 moves rearwardly the end of the finger 94 engages the reset lever 91 adjacent the lower end thereof and swings it rearwardly about its pivotal point. When the reset lever reaches the point where it resets the overload switch 90 the end of the lever 91 has swung up out of the path of the finger 94. As the finger 94 continues to move rearwardly it engages the cam surface 98 of the member 97 and is swung downwardly as shown in Fig. 6.

When the overload switch 90 is reset it starts the motor 74 which drives the stirring device as previously described.

When the viscosity of the substance being frozen in the container 60 reaches a certain point where an excessive strain is placed on the motor 74 the overload switch 90 throws out thereby stopping the motor and the action of the stirring device 65.

When the overload switch 90 throws out it moves the reset lever 91 from the full line position shown in Fig. 6 to the dotted line position and when the container is removed from the refrigerator the finger 94 of the rod 92 moves under the end of the reset lever until it reaches its forward position where the spring 95 moves it upward to its initial position wherein it can again engage the reset lever.

From the foregoing description it will be apparent that I have provided a novel freezing device which is simple in construction and efficient in use.

Having thus described my invention, what I claim is:

In an iceless refrigerator including a freezing compartment and a housing having a motor therein, a container adapted to be placed in said compartment, a rotatable stirring device in said container, a motor, means operable automatically on the insertion of said container into said compartment to cause said motor to start, means whereby said motor rotates said stirring device and an electrically operated overload switch associated with said stirring device and said motor, means whereby when the viscosity of the substance being frozen in said container reaches a certain point the overload switch will cause the operation of said motor to be discontinued and means operable automatically on the insertion of the receptacle into the compartment to actuate the overload switch to set position.

MARTIN G. TORSON.